(12) United States Patent
Hao et al.

(10) Patent No.: US 12,278,065 B2
(45) Date of Patent: Apr. 15, 2025

(54) ELECTRICALLY-CONTACTLESS JOYSTICK AND TERMINAL DEVICE

(71) Applicants: HONGFUJIN PRECISION ELECTRONS (YANTAI) CO., LTD., Yantai (CN); HON HAI PRECISION INDUSTRY CO., LTD., New Taipei (TW)

(72) Inventors: Yu-Hsiang Hao, New Taipei (TW); Chien-Heng Chen, New Taipei (TW); Cheng-Yeh Sun, New Taipei (TW); Yao-Che Peng, New Taipei (TW)

(73) Assignees: HONGFUJIN PRECISION ELECTRONS (YANTAI) CO., LTD., Yantai (CN); HON HAI PRECISION INDUSTRY CO., LTD., New Taipei (TW)

( * ) Notice: Subject to any disclaimer, the term of this patent is extended or adjusted under 35 U.S.C. 154(b) by 195 days.

(21) Appl. No.: 17/951,338

(22) Filed: Sep. 23, 2022

(65) Prior Publication Data

US 2023/0121800 A1    Apr. 20, 2023

(30) Foreign Application Priority Data

Oct. 15, 2021   (CN) .......................... 202122486607.3

(51) Int. Cl.
*H01H 21/24* (2006.01)
*G06F 3/0338* (2013.01)
*H01H 21/04* (2006.01)

(52) U.S. Cl.
CPC ........... *H01H 21/24* (2013.01); *G06F 3/0338* (2013.01); *H01H 21/04* (2013.01)

(58) Field of Classification Search
CPC ............... H01H 36/00; H01H 36/0006; H01H 36/0026; H01H 36/0033; H01H 36/006; H01H 2001/54; H01H 2219/004; H01H 2221/022; H01H 25/00; H01H 25/04; H01H 25/06; H01H 21/04; H01H 21/24; G06F 3/0338
USPC ....................................................... 200/329
See application file for complete search history.

(56) References Cited

U.S. PATENT DOCUMENTS

| | | | |
|---|---|---|---|
| 7,265,304 B2* | 9/2007 | Ichiki ................. | F15B 13/0424 200/6 A |
| 2003/0058219 A1* | 3/2003 | Shaw .................... | G06F 3/0338 345/161 |
| 2020/0393865 A1* | 12/2020 | Parazynski .............. | G05G 5/03 |

* cited by examiner

*Primary Examiner* — Anthony R Jimenez
(74) *Attorney, Agent, or Firm* — ScienBiziP, P.C.

(57) ABSTRACT

An electrically-contactless joystick includes a housing, a handle, a first limiting member, a second limiting member, an elastic member, a magnet, and a magnetic sensor. The handle extends through the housing. The first limiting member and the second limiting member are fixed to the handle and movably clamped with the housing. The elastic member is connected to each of the first limiting member, the second limiting member, and the housing. The second limiting member abuts against the handle. The magnet is fixed to either the handle or the housing, and the magnetic sensor is fixed to the other. A terminal device is also provided.

20 Claims, 12 Drawing Sheets

ELECTRICALLY-CONTACTLESS JOYSTICK AND TERMINAL DEVICE

FIELD

The subject matter herein generally relates to non-contact sensing, and more particularly, to a joystick and a terminal device.

BACKGROUND

Joysticks may include carbon films and carbon brushes disposed on the carbon films. Different resistance values are generated when the carbon brush contacts different positions on the carbon brush, and orientation of the joysticks are calculated based on the resistance values. However, the carbon brush or the carbon film will be worn out after repeated use, resulting in inaccurate sensing. In addition, the costs of the carbon brush and the carbon film are high. Therefore, there is a room for improvement in the art.

BRIEF DESCRIPTION OF THE DRAWINGS

Implementations of the present technology will now be described, by way of example only, with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts may be exaggerated to better illustrate details and features of the present disclosure.

The term "comprising," when utilized, means "including, but not necessarily limited to"; it specifically indicates open-ended inclusion or membership in the so-described combination, group, series, and the like.

Some embodiments of the present disclosure will be described in detail with reference to the drawings. If no conflict, the following embodiments and features in the embodiments can be combined with each other.

Figure 1:
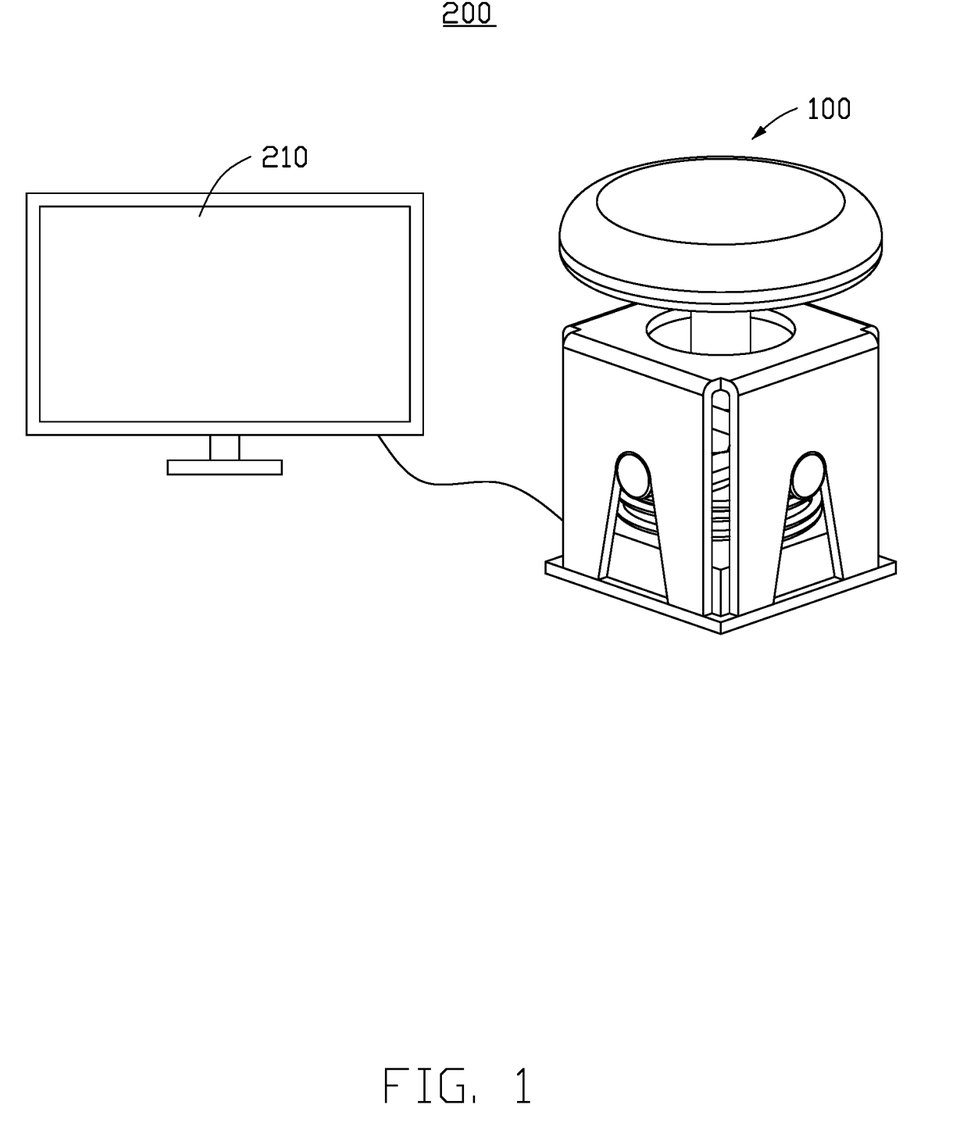
FIG. 1 is a diagrammatic view of an embodiment of a terminal device according to the present disclosure.
Figure 2:
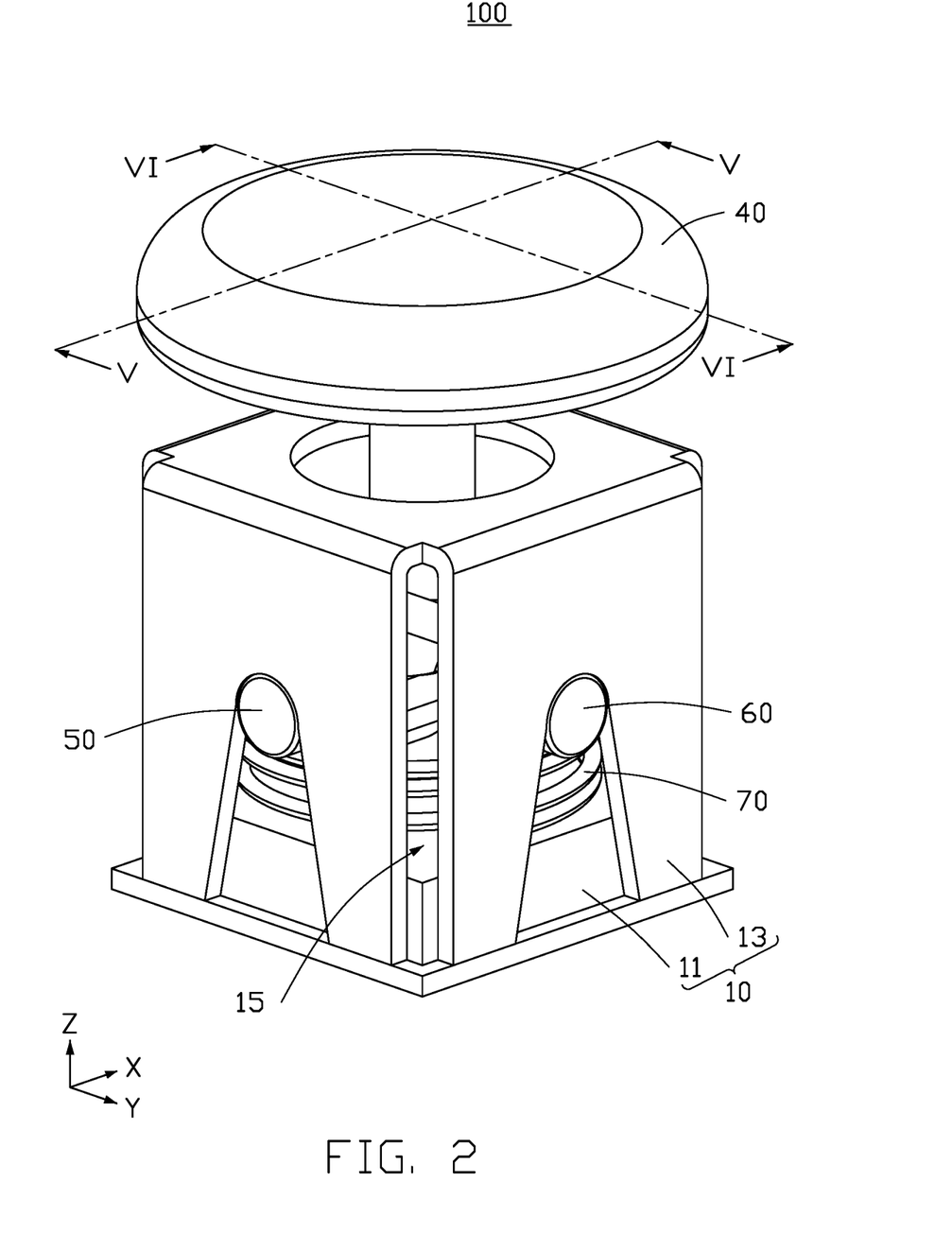
FIG. 2 is diagrammatic view of an embodiment of a joystick of the terminal device of FIG. 1.

Referring to FIGS. 1 and 2, a terminal device 200 is provided according to an embodiment of the present disclosure. The terminal device 200 may be a game machine, a steering wheel, a knob, or the like. The terminal device 200 includes a joystick 100 and a processor 210. The joystick 100 is electrically connected to the processor 210, a handle 40 (referring to FIG. 3) in the joystick 100 can generate displacement, and the processor 210 can obtain and calculate displacement of the handle 40 on a display device.

Referring to FIGS. 3, 4, 5, and 6, the joystick 100 includes a housing 10, the handle 40, a first limiting member 50, a second limiting member 60, an elastic member 70, a magnet 20, and a magnetic sensor 30. The handle 40 can cover any part of a 360° circle. The first limiting member 50 is fixed to the handle 40 and swings with the swing of the handle 40. The second limiting member 60 can cooperate with the housing 10 to hold the handle 40, so that the handle 40 can swing instead of moving. A pivot point of the swing is determined by a contact point between the second limiting member 60 and the handle 40.

In the embodiment, an extending direction of the first limiting member 50 is defined as the X axis, and an extending direction of the second limiting member 60 is defined as the Y axis. The X-axis is perpendicular to the Y-axis, and a direction perpendicular to both the X-axis and the Y-axis is defined as Z-axis. An XY plane is defined by the X-axis and the Y-axis is. In other embodiments, the extending direction of the first limiting member 50 and the extending direction of the second limiting member 60 may also be at other angles, as long as their respective functions can be achieved.

The housing 10 includes a base 11 and a cover 13. The base 11 and the cover 13 form an accommodating space 15. The first limiting member 50, the second limiting member 60, and the elastic member 70 can be accommodated in the accommodating space 15. The housing 10 is made of magnetically permeable material, so as to reduce or avoid an external magnetic field interfering with the magnet 20 and the magnetic sensor 30.

In the embodiment, a portion of a surface of the base 11 facing away from the cover 13 is recessed to form a groove 112 (referring to FIG. 4), and the magnetic sensor 30 is fixedly disposed in the groove 112. The magnet 20 is fixed to the handle 40, and the handle 40 can be displaced relative to the base 11, so that the magnetic sensor 30 senses the position of the magnet 20, and the position of the handle 40 can be calculated by the processor 210 which is electrically connected to the magnetic sensor 30.

When the handle 40 is in an initial state, the magnetic sensor 30 acquires an initial magnetic field component of the magnet 20. After the handle 40 is swung relative to the housing 10, the magnet 20 and the magnetic sensor 30 are displaced relative to each other. The magnetic sensor 30 identifies the difference between the magnetic field components of the magnet 20 in the X-axis, Y-axis, and Z-axis and the initial magnetic field component. The displacement of the handle 40 compared to the initial state is obtained by calculating the displacement of the handle 40 by the processor 210 so as to obtain an attitude information of the magnet 20, and then analyze and obtain an attitude information of the handle 40.

In some embodiments, the installation position of the magnetic sensor 30 is not limited to being provided in the groove 112. The magnetic sensor 30 may also be disposed on the base 11 facing the cover 13, or on a surface or inside of the cover 13. In some embodiments, the installation positions of the magnetic sensor 30 and the magnet 20 can also be interchanged. That is, the magnetic sensor 30 is fixedly connected to the handle 40, and the magnet 20 is fixed to the housing 10. Thus when the magnetic sensor 30 is disposed on the base 11 and is disposed correspondingly to the handle 40, calculation and identification by the processor 210 becomes more precise.

Figure 3:
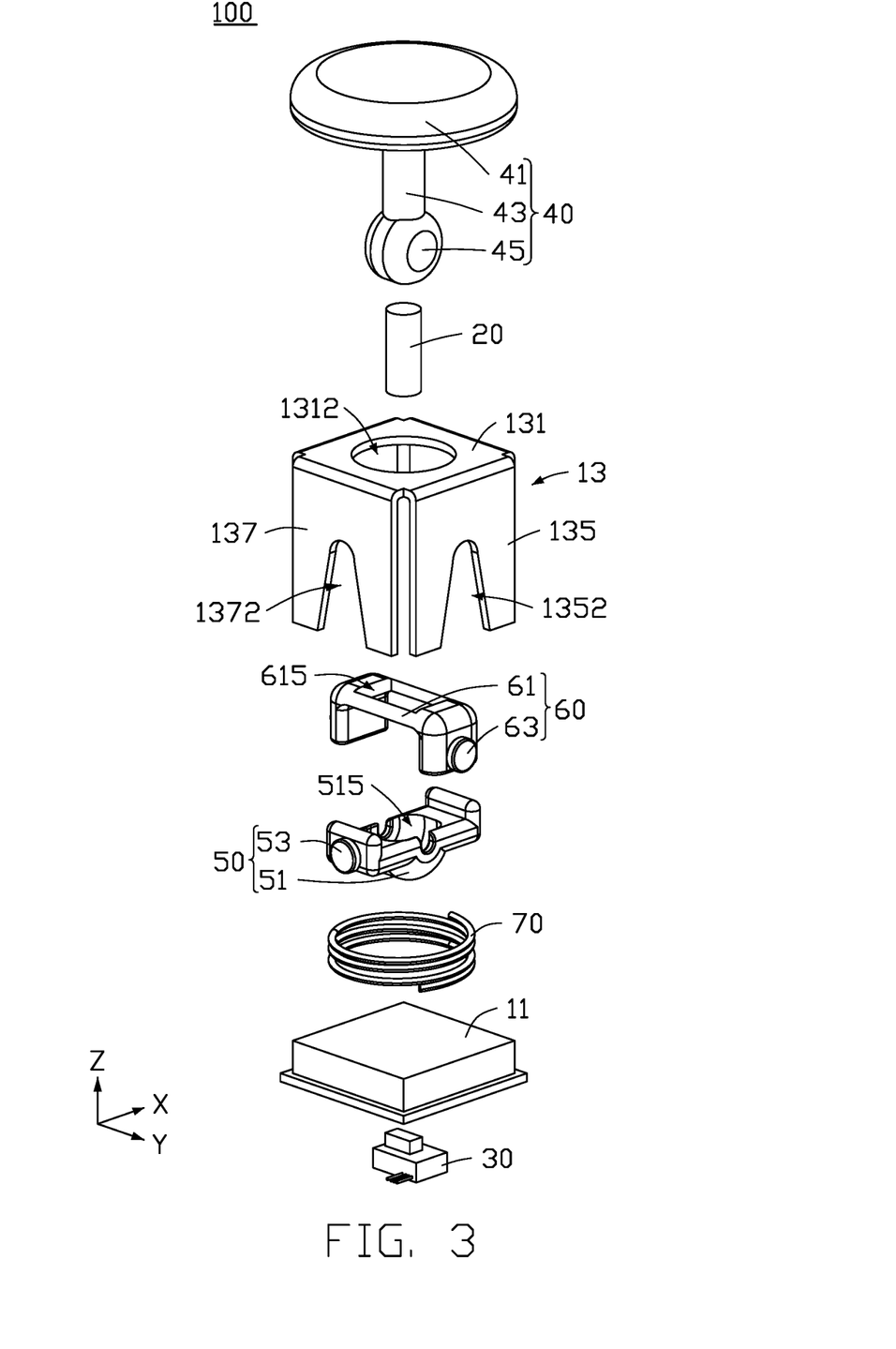
FIG. 3 is an exploded view of the joystick of FIG. 2.
Figure 4:
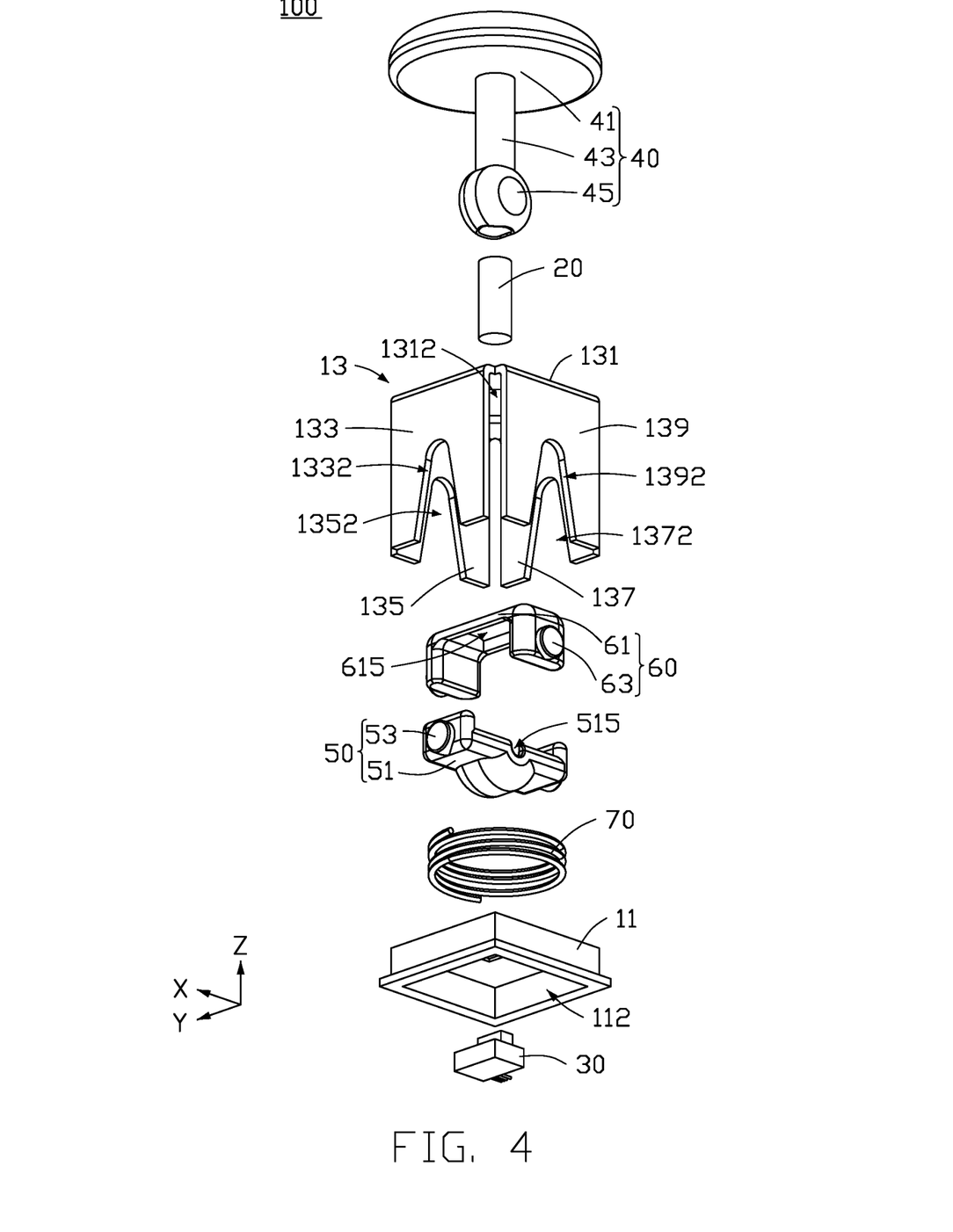
FIG. 4 is similar to FIG. 3, but showing the joystick from another angle.

The cover 13 includes a top wall 131, a first sidewall 133, a third sidewall 135, a second sidewall 137, and a fourth sidewall 139. The first sidewall 133, the third sidewall 135, the second sidewall 137, and the fourth sidewall 139 are connected in that order and extend from a periphery of the top wall 131 toward the base 11. That is, the first sidewall 133 is disposed opposite to the second sidewall 137, and the third sidewall 135 is disposed opposite to the fourth sidewall 139.

A first through hole 1312 is defined on the top wall 131. An opening direction of the first through hole 1312 is along the Z-axis. The first through hole 1312 communicates with the accommodating space 15. The first through hole 1312 is used for the handle 40 to extend through the top wall 131 and extend into the accommodating space 15. A first opening 1332 is defined on the first sidewall 133, a third opening 1352 is defined on the third sidewall 135, a second opening 1372 is defined on the second sidewall 137, and a fourth opening 1392 is defined on the fourth sidewall 139. Opening directions of the first opening 1332 and the second opening 1372 are along the X-axis, opening directions of the third opening 1352 and the fourth opening 1392 are along the Y-axis. The first opening 1332 and the second opening 1372 are used for limiting the first limiting member 50, and the third opening 1352 and the fourth opening 1392 are used for limiting the second limiting member 60.

The first opening 1332, the third opening 1352, the second opening 1372, and the fourth opening 1392 are all in the shape of an inverted and expanding U-shape, that is, with a large lower end opening. That is, each of a width of each of the first opening 1332, the third opening 1352, the second opening 1372, and the fourth opening 1392 facing the base 11 is larger than a width of an end facing away from the base 11. The inverted U-shaped first opening 1332, the third opening 1352, the second opening 1372, and the fourth opening 1392 facilitate the assembly of the joystick 100. In addition, a movable space so provided for the first limiting member 50 and the second limiting member 60 allow full swinging of the handle 40.

The handle 40 includes an operating portion 41, a rod portion 43, and a fixing portion 45 connected in that order, that is, the rod portion 43 connects the operating portion 41 and the fixing portion 45. The operating portion 41 can be a sphere, a cuboid, a cube, or other shapes, as long as it is convenient for the user to operate by hand. In the embodiment, the operating portion 41 is a sphere, and a cross-sectional dimension of the operating portion 41 is larger than a cross-sectional dimension of the rod portion 43 and the fixing portion 45. Before a push or a press is applied to the handle 40, the handle 40 fully extends through the first through hole 1312 along the Z-axis. The operating portion 41 is located outside the accommodating space 15 formed by the housing 10, which facilitates the user to operate the handle 40. The rod portion 43 is inserted into the accommodating space 15 from the first through hole 1312 of the top wall 131. In the embodiment, the magnet 20 is located inside the rod portion 43 and is fixed to the rod portion 43. The whole of the fixing portion 45 is accommodated in the accommodating space 15, and the fixing portion 45 is fixed to the first limiting member 50. The fixing portion 45 is a flat ellipsoid.

The first limiting member 50 includes a first main body 51 and two first clamping portions 53 disposed on both sides of the first main body 51, and the two first clamping portions 53 extend along the X-axis. The first main body 51 corresponds to the handle 40. An accommodating groove 515 is defined on the first main body 51 matching the fixing portion 45. The fixing portion 45 is accommodated in the accommodating groove 515 to fix and support the handle 40. In the embodiment, the accommodating groove 515 is substantially flat and ellipsoid shaped. When the fixing portion 45 is accommodated in the accommodating groove 515, the handle 40 is prevented from rotating relative to the first limiting member 50 to cause ineffective and undesired motion, which affects the user experience. In some embodiments, the handle 40 may also be secured and supported in other ways, such as by bonding.

Each of the two first clamping portions 53 is cylinder-shaped. The two first clamping portions 53 extend along opposite ends of the first main body 51. The first main body 51 is disposed in the accommodating space 15. The first clamping portions 53 disposed at both ends of the first main body 51 penetrate through the first opening 1332 and the second opening 1372. A first gap 535 is formed between a surface of the first main body 51 for connecting with the two first clamping portions 53 and one of the first sidewall 133 and the second sidewall 137. The first gap 535 facilitates a movement of the first limiting member 50 in the accommodating space 15. The cooperation of the first opening 1332, the second opening 1372 and the first gap 535 enables the first limiting member 50 to move in the space in the XY plane.

The second limiting member 60 includes a second main body 61 and two second clamping portions 63 disposed on both sides of the second main body 61. The two second clamping portions 63 extend along the Y-axis. A second through hole 615 is defined on the second main body 61. The second through hole 615 is elongated to form, for example, a rectangle. The rod portion 43 of the handle 40 extends through the second through hole 615. The fixing portion 45 is a flat ellipsoid, which is also beneficial for the handle 40 to extend through the second through hole 615. The second through hole 615 has a width in the X-axis and a length in the Y-axis. The length is greater than the width, and the length is greater than a dimension of the fixing portion 45 along the X-axis, so that the fixing portion 45 can extend through the second through hole 615. The width is slightly larger than the diameter of the rod portion 43 and smaller than the dimension of the fixing portion 45 along the Z-axis, so that after the fixing portion 45 extends through the second through hole 615 and rotates the fixing portion 45, the fixing portion 45 will abut against the second main body 61. The second main body 61 is substantially concave. The second body portion 61 is recessed away from a surface facing the fixing portion 45. When the first body portion 51 is accommodated in the recessed space of the second body portion 61, the second body portion 61 is connected to the elastic member 70. Each of the two second clamping portions 63 is a cylinder, and the two second clamping portions 63 extend along opposite ends of the second main body 61. The second main body 61 is disposed in the accommodating space 15. The two second clamping portions 63 penetrate respectively through the third opening 1352 and the fourth opening 1392. A second gap 635 is formed between a surface of the second main body 61 for connecting the second clamping portions 63 and one of the third sidewall 135 and the fourth sidewall 139, so that the second limiting member 60 has space to move in the accommodating space 15. The cooperation of the third opening 1352 and the fourth opening 1392 with the second gap 635 enable the second limiting member 60 to move in the space in the XY plane.

The elastic member 70 is disposed on the base 11 facing the cover 13 and accommodated in the accommodating space 15. One end of the elastic member 70 is connected to the base 11, and the other end of the elastic member 70 is connected to the first limiting member 50 and the second limiting member 60. In the embodiment, the elastic member 70 is a compression spring.

Figure 5:
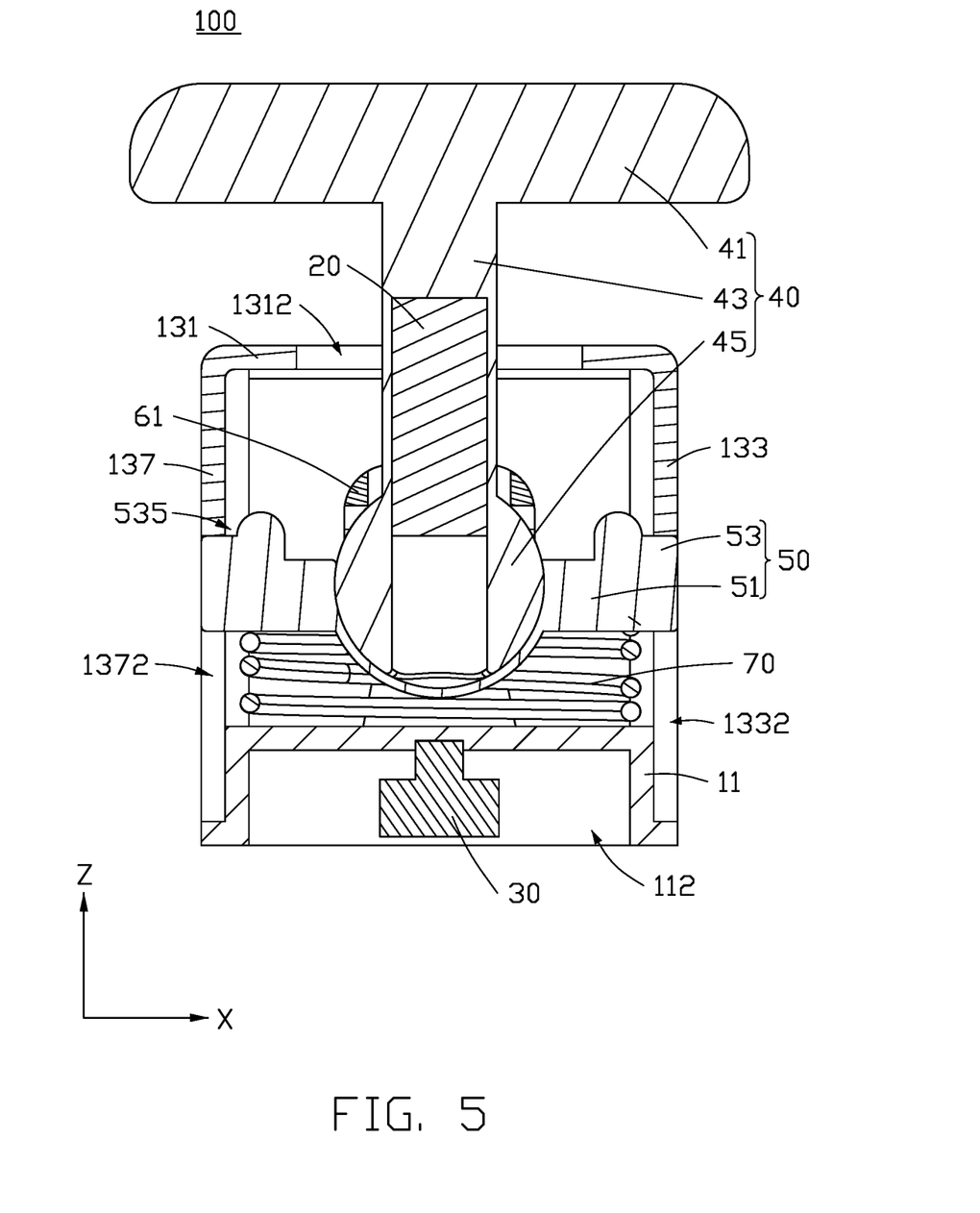
FIG. 5 is a cross-sectional view taken along line V-V of FIG. 2.
Figure 6:
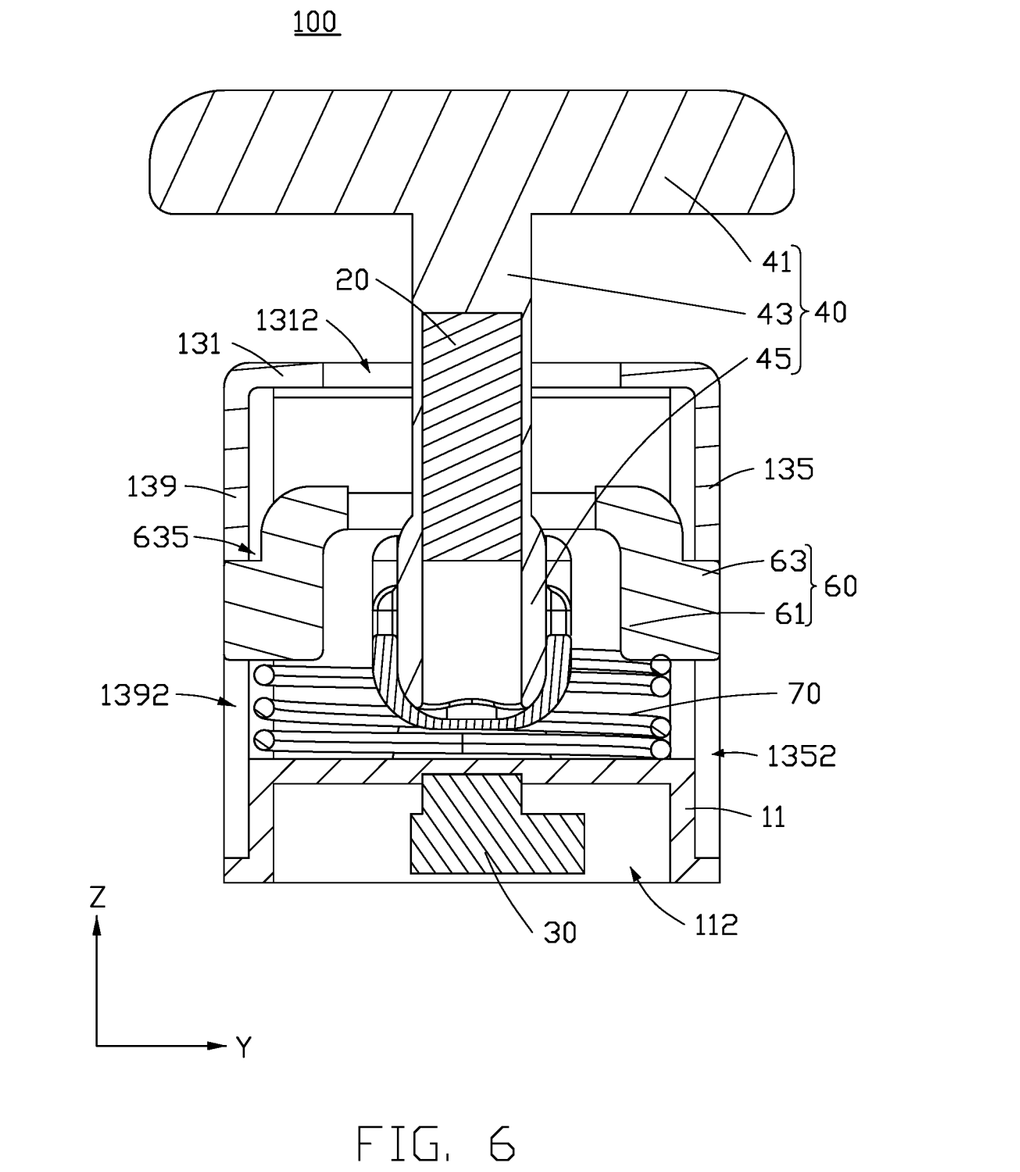
FIG. 6 is a cross-sectional view taken along line VI-VI of FIG. 2.

The first main body 51 of the first limiting member 50 is connected to the elastic member 70, the second main body 61 of the second limiting member 60 is connected to the elastic member 70, and the elastic member 70 is in a compressed state. Under the elastic action of the elastic member 70, the two first clamping portions 53 are retained in the first opening 1332 and the second opening 1372, and the two second clamping portions 63 are retained in the third opening 1352 and the fourth opening 1392. A side of the fixing portion 45 away from the base 11 abuts against the second main body 61, to keep the handle 40 perpendicular to the XY plane and the handle 40 can be extended along the Z-axis. In addition, a contact point connecting the fixing portion 45 and the second main body 61 determines the swing fulcrum of the handle 40. In the embodiment, there are two contact points, and the center of the two contact points can be regarded as the swing fulcrum.

The interaction among the first limiting member 50, the second through hole 615, the first opening 1332, and the second opening 1372, and the interaction among the second limiting member 60, the second through hole 615, the third opening 1352, and the fourth opening 1392, the limiting handle 40 is allowed a tapering pendulum motion along the Z-axis. Since the handle 40 will drive the movement of the second limiting member 60 during a swinging process, the fulcrum of the conic pendulum movement will also change correspondingly in the three-dimensional space.

When the push or the press is applied to the operating portion 41 in the X-axis, since the fixing portion 45 is fixed to the first limiting member 50, the swing fulcrum (disposed on the side of the fixing portion 45 facing the rod portion 43) is disposed between the operating portion 41 and the fixing portion 45, the first limiting member 50 is movably clamped in the first opening 1332 and the second opening 1372, and the first limiting member 50 swings in a direction opposite to the X-axis, while the elastic member 70 is deformed. When the push or the press is stopped, the elastic member 70 restores the deformation, the first limiting member 50 restores to the initial position under the action of the elastic member 70 and drives the handle 40 to restore to the initial position at the same time. Wherein, during the deformation process of the elastic member 70, the second limiting member 60 is also driven to be displaced.

When the push or the press is applied to the operating portion 41 in the Y-axis, since the fixing portion 45 is fixed to the first limiting member 50, the swing fulcrum is disposed between the operating portion 41 and the fixing portion 45, the first limiting member 50 has a tendency to move along the Y-axis. The first opening 1332 and the second opening 1372 are inverted U-shapes with large openings at lower ends, and each of the two first clamping portions 53 has a space for moving along the Y-axis. Then, the first limiting member 50 swings in the direction opposite to the Y-axis, so that the handle 40 drives the first limiting member 50 to move along the Y-axis. The handle 40 can also swing along the Y-axis, and the movement of the first limiting member 50 drives the elastic member 70 to deform. When the push or the press is stopped, the elastic member 70 restores the deformation, the first limiting member 50 restores to the initial position under the action of the elastic member 70 and drives the handle 40 to restore to the initial position at the same time. Wherein, during the deformation process of the elastic member 70, the second limiting member 60 is also driven to be displaced.

When the push or the press is applied to the operating portion 41 of the handle 40 in any direction perpendicular to the Z-axis and in any direction other than the X-axis and the Y-axis, the swing fulcrum is disposed between the operating portion 41 and the fixing portion 45, the first limiting member 50 moves in the opposite direction to the acting direction. The cooperation of the first limiting member 50 with the first opening 1332, the second opening 1372, and the first gap 535 enables the first limiting member 50 to move in the space in the XY plane, so that the handle 40 can swing along the action direction. When the push or the press is stopped, the elastic member 70 restores the deformation, the first limiting member 50 restores to the initial position under the action of the elastic member 70 and drives the handle 40 to restore to the initial position at the same time. Wherein, during the deformation process of the elastic member 70, the second limiting member 60 is also driven to be displaced.

The interaction of the first limiting member 50, the second limiting member 60, the housing 10, and the elastic member 70 enables the handle 40 to cover all parts of the full circle in a cone pendulum motion with the Z-axis as the axis.

In some embodiments, when the extending direction of the first limiting member 50 and the extending direction of the second limiting member 60 are at other angles, the direction of the first opening 1332, the third opening 1352 and the second opening 1372 on the housing 10 which cooperate with the first limiting member 50 and the second limiting member 60 can also be adjusted.

The following describes the installation process of the joystick 100 provided in this embodiment in detail.

Figure 7:
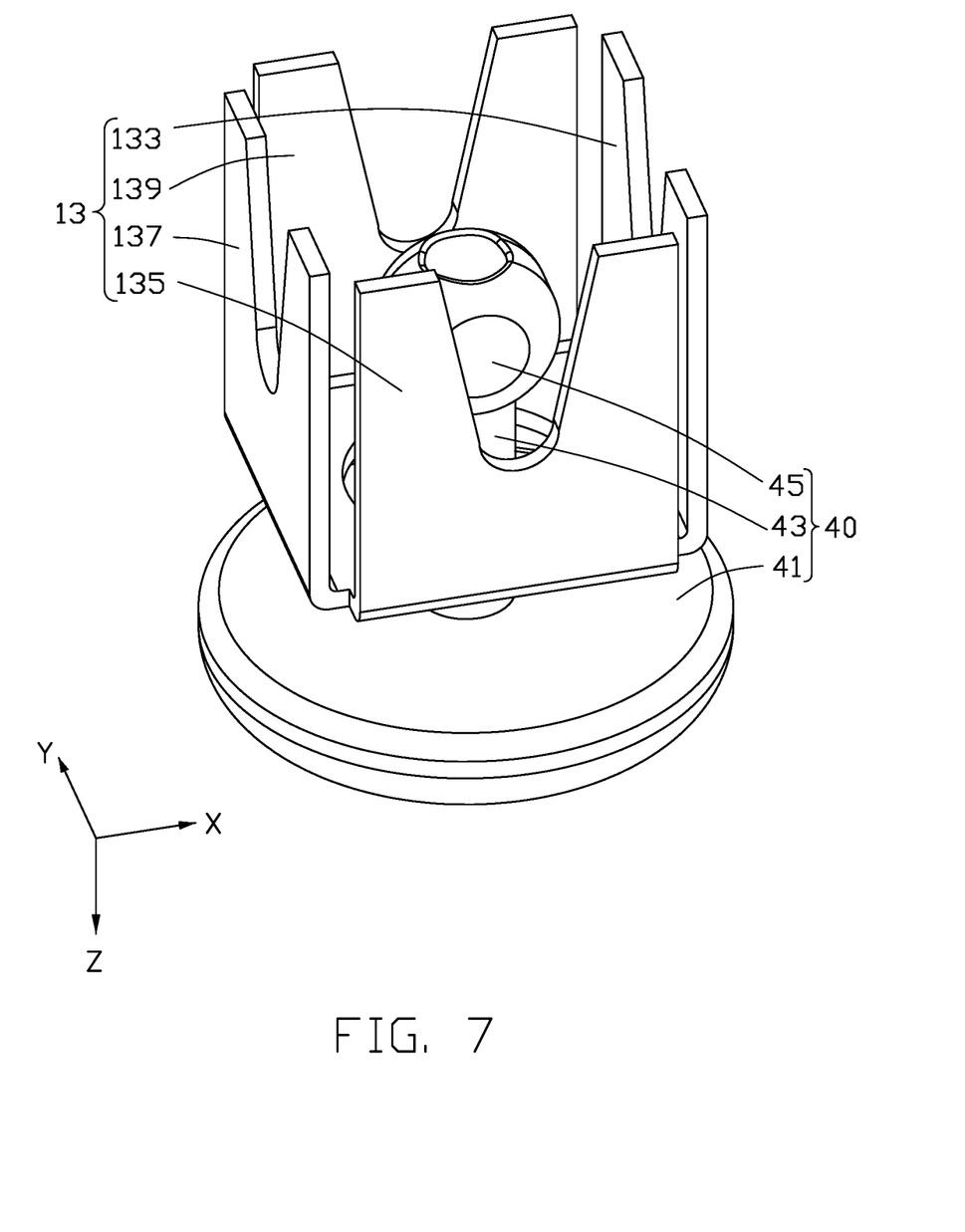
FIG. 7 is a diagrammatic view of an assembled cover and a handle of the joystick of FIG. 3.

Step 1: referring to FIG. 7, the cover 13 and the handle 40 are assembled. The fixing portion 45 of the handle 40 extends through the first through hole 1312 of the top wall 131. The fixing portion 45 is disposed in the space formed by the top wall 131, the first sidewall 133, the third sidewall 135, the second sidewall 137, and the fourth sidewall 139. The magnet 20 is disposed in the handle 40.

Figure 8:
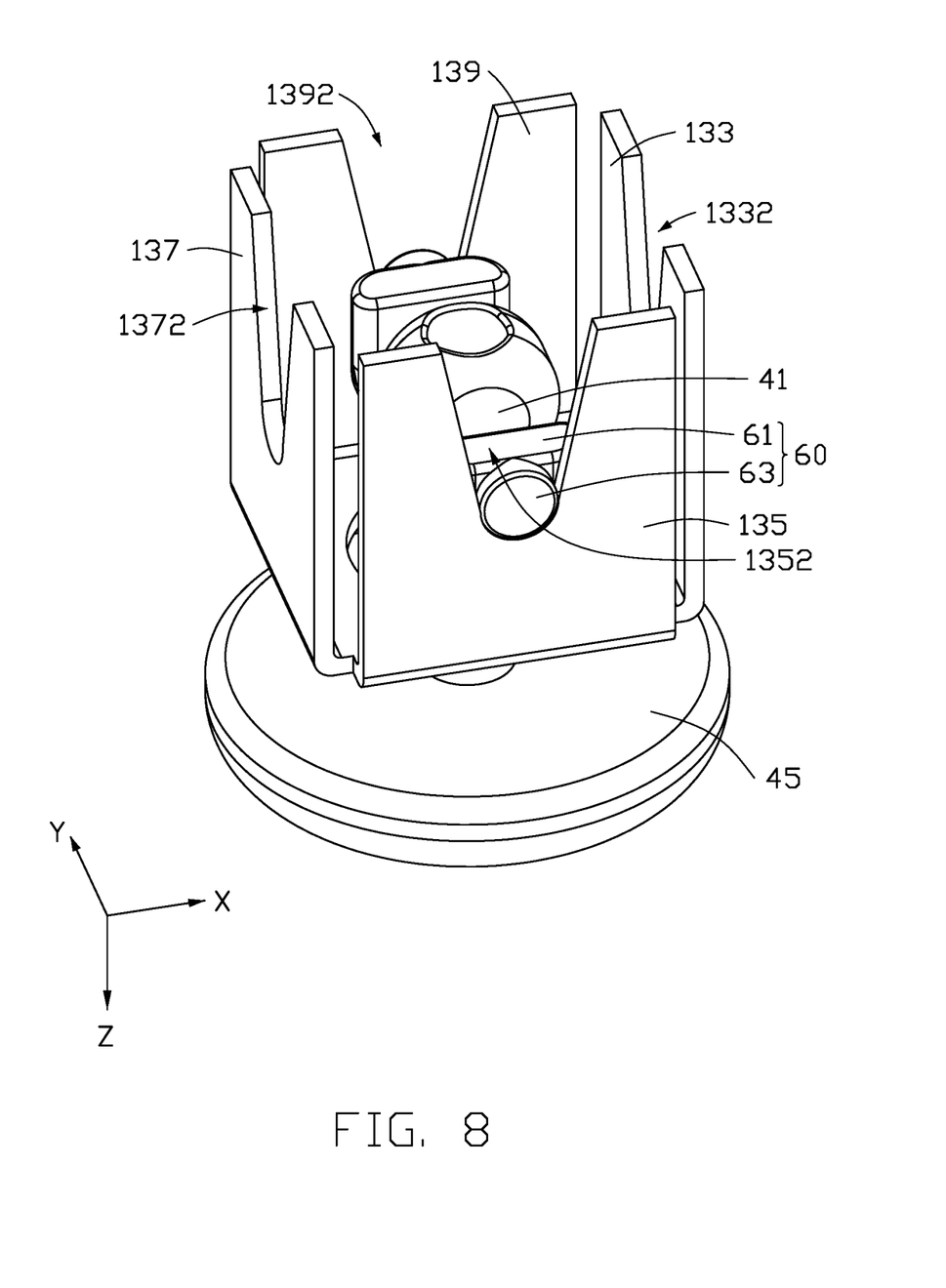
FIG. 8 is a diagrammatic view showing a second limiting frame assembled on the handle of FIG. 7.

Step 2: referring to FIG. 8, the second limiting member 60 is assembled. The fixing portion 45 extends through the second through hole 615, and the two second clamping portions 63 are held in the third opening 1352 and the fourth opening 1392. After extending the fixing portion 45 through the second through hole 615, the handle 40 is rotated by 90°, so that the second limiting member 60 extends along the Y-axis, and the flat fixing portion 45 extends along the X-axis.

Figure 9:
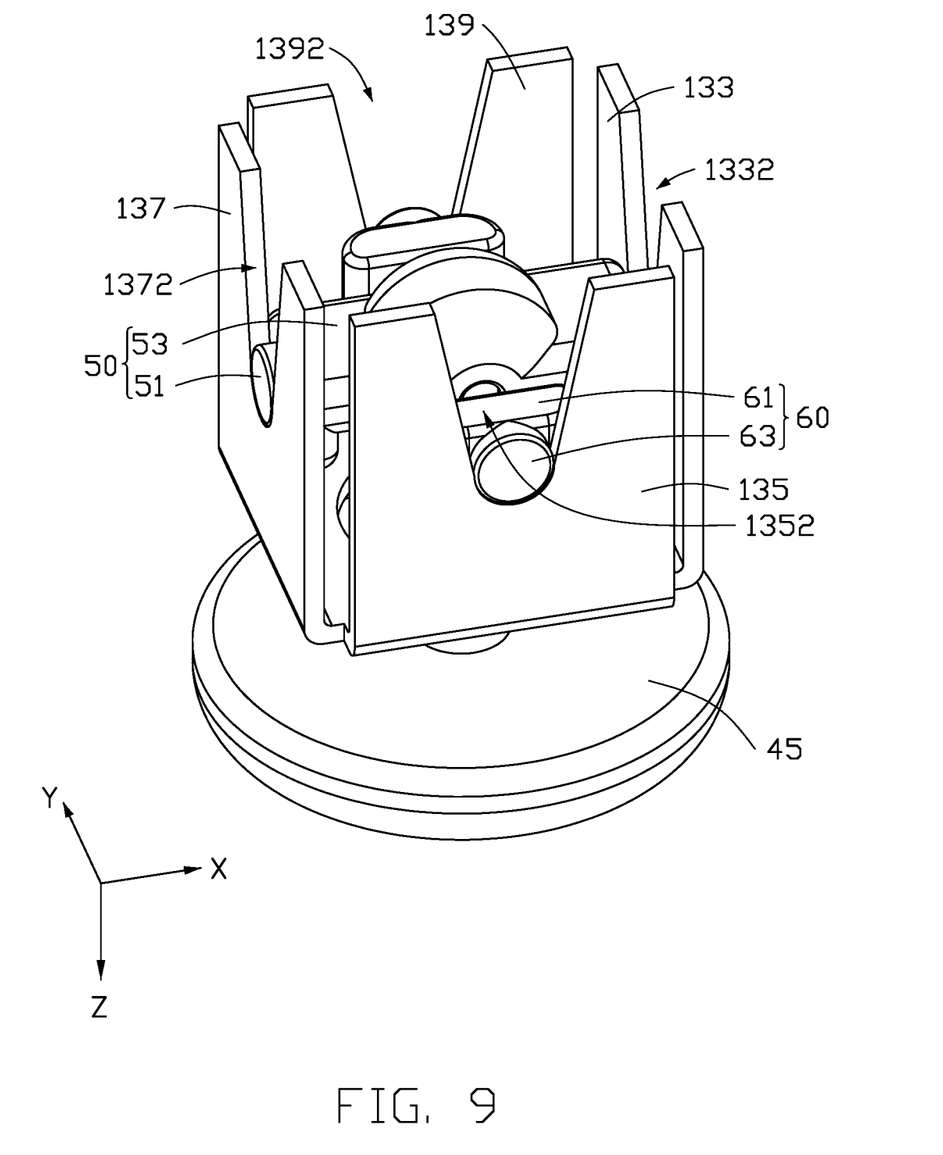
FIG. 9 is a diagrammatic view showing a first limiting frame assembled on the handle of FIG. 8.

Step 3: referring to FIG. 9, the first limiting member 50 is assembled. The first limiting member 50 extends along the X-axis to hold the two first clamping portions 53 in the first opening 1332 and the second opening 1372. The fixing portion 45 is accommodated in the accommodating groove 515 of the first limiting member 50, that is, the extending direction of the first limiting member 50 and the extending direction of the second limiting member 60 are perpendicular to each other.

Figure 10:
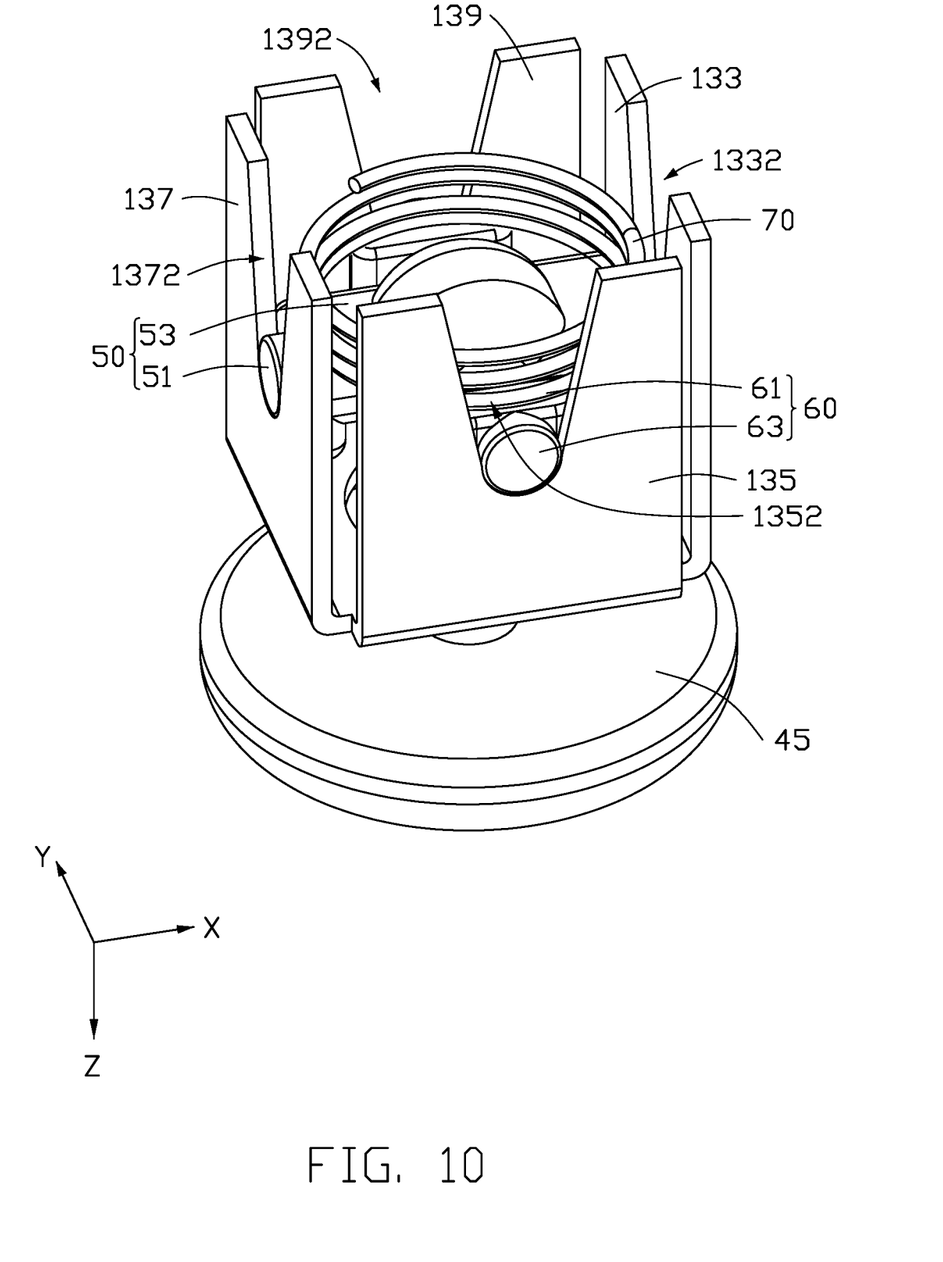
FIG. 10 is a diagrammatic view showing an elastic member assembled on the first limiting frame of FIG. 9.

Step 4: referring to FIG. 10, the elastic member 70 is assembled. The elastic member 70 is fixed to the first body portion 51 of the first limiting member 50 and the second body portion 61 of the second limiting member 60.

Figure 11:
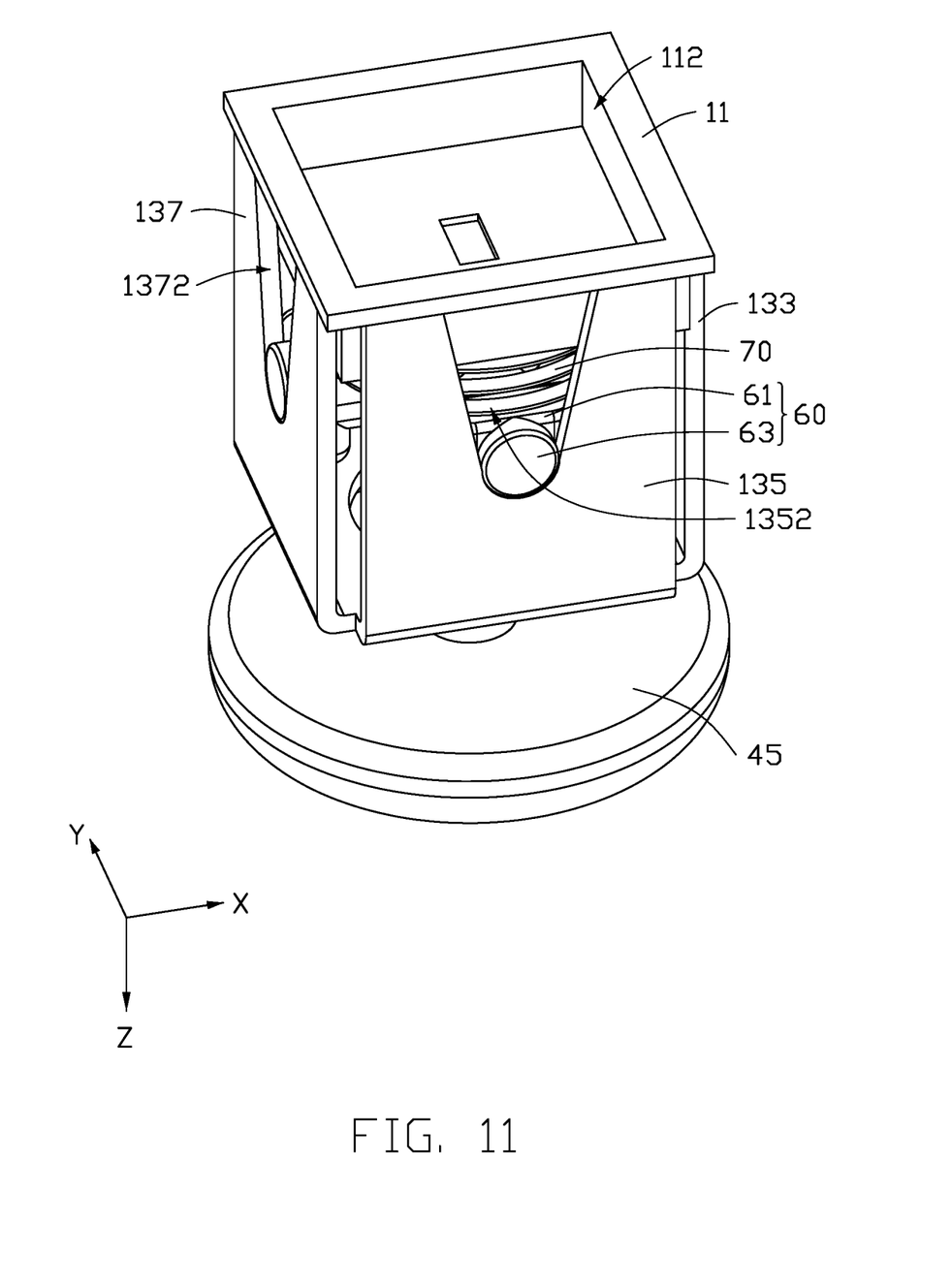
FIG. 11 is a diagrammatic view showing a base member assembled on the cover of FIG. 10.

Step 5: referring to FIG. 11, the base 11 is assembled. The base 11 is fixed to the elastic member 70 so that the elastic member 70 is in a compressed state, and the base 11 is fixed to the cover 13. The handle 40, the first limiting member 50, the second limiting member 60, and the elastic member 70 are within the accommodating space 15 formed by the base 11 and the cover 13.

Figure 12:
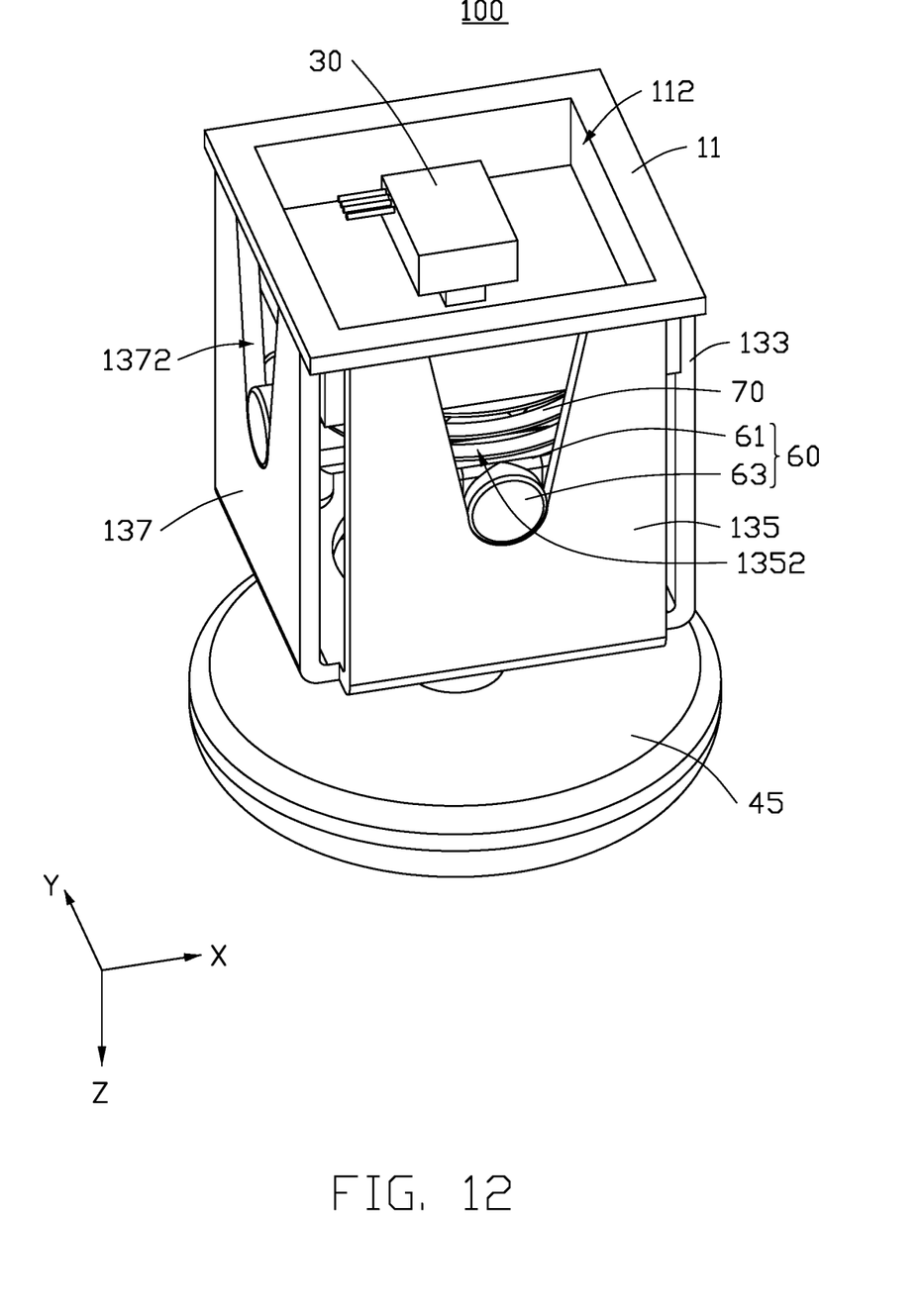
FIG. 12 is a diagrammatic view of the joystick with magnetic sensor assembled on the base member of FIG. 11.

Step 6: referring to FIG. 12, the magnetic sensor 30 is fixed in the groove 112 of the base 11.

The joystick 100 provided in the present disclosure enables the handle 40 to swing in a preset direction through the interaction of the housing 10, the first limiting member 50, the second limiting member 60, and the elastic member 70. When the handle 40 is not pushed or pressed, the handle 40 is restored to the initial state under the action of the elastic member 70. The magnet 20 and the magnetic sensor 30 are respectively disposed on the housing 10 and the handle 40, and the non-contact sensing mode of the magnet 20 and the magnetic sensor 30 replaces the conventional carbon brush and carbon film contact sensing mode of the prior art. Therefore, there is no wearing out of carbon material, and the number of precision parts such as carbon brushes and carbon films is also reduced. In addition, since the magnet 20 and the magnetic sensor 30 cooperate with each other, the sensing sensitivity is enhanced.

It is to be understood, even though information and advantages of the present embodiments have been set forth in the foregoing description, together with details of the structures and functions of the present embodiments, the disclosure is illustrative only; changes may be made in detail, especially in matters of shape, size, and arrangement of parts within the principles of the present embodiments to the full extent indicated by the plain meaning of the terms in which the appended claims are expressed.

What is claimed is:

1. A joystick comprising:
    a housing;
    a handle extending through the housing;
    a first limiting member fixed to the handle and movably clamped to the housing;
    a second limiting member movably connected to the handle and movably clamped to the housing;
    an elastic member connected to each of the first limiting member, the second limiting member, and the housing; the elastic member is in a compressed state, the second limiting member abutting against the handle;
    a magnet; and
    a magnetic sensor,
    wherein the magnet is fixed to one of the handle and the housing, and the magnetic sensor is fixed to the other one of the handle and the housing.

2. The joystick of claim 1, wherein the housing comprises a base and a cover, the base and the cover form an accommodating space; the first limiting member, the second limiting member, and the elastic member are accommodated in the accommodating space.

3. The joystick of claim 2, wherein the elastic member is connected between the base and the first limiting member.

4. The joystick of claim 2, wherein a groove is defined on the base away from the cover, and the magnetic sensor is disposed in the groove.

5. The joystick of claim 2, wherein the cover comprises a top wall, a first sidewall, a third sidewall, a second sidewall, and a fourth sidewall; the first sidewall, the third sidewall, the second sidewall, and the fourth sidewall are connected in that order and extend from a periphery of the top wall toward the base.

6. The joystick of claim 5, wherein a first through hole is defined on the top wall, and the handle extends through the first through hole.

7. The joystick of claim 6, wherein the handle comprises an operating portion, a rod portion, and a fixing portion connected in that order; the operating portion is disposed outside the accommodating space, the rod portion extends through the first through hole, and the fixing portion is disposed in the accommodating space.

8. The joystick of claim 7, wherein a first opening is defined on the first sidewall, and a second opening is defined on the second sidewall; the first limiting member comprises a first main body and two first clamping portions disposed on both sides of the first main body, and each of the two first clamping portions is disposed in the first opening and the second opening.

9. The joystick of claim 8, wherein a width of one end of the first opening facing the base is larger than a width of an end of the first opening facing away from the base; a width of one end of the second opening facing the base is larger than a width of an end of the second opening.

10. The joystick of claim 8, wherein a first gap is formed between the first main body and one of the first sidewall and the second sidewall.

11. The joystick of claim 8, wherein an accommodating groove is defined on the first main body, and the fixing portion is accommodated in the accommodating groove.

12. The joystick of claim 11, wherein the fixing portion is a flat ellipsoid, and the accommodating groove matches the fixing portion in shape.

13. The joystick of claim 7, wherein a third opening is defined on the third sidewall, and a fourth opening is defined on the fourth sidewall; the second limiting member comprises a second main body and two second clamping portions disposed on both sides of the second main body, and the two second clamping portions are disposed in the third opening and the fourth opening.

14. The joystick of claim 13, wherein a width of one end of the third opening facing the base is larger than a width of an end of the third opening facing away from the base; a width of one end of the fourth opening facing the base is larger than a width of an end of the fourth opening.

15. The joystick of claim 13, wherein a second gap is formed between the second main body and one of the third sidewall and the fourth sidewall.

16. The joystick of claim 13, wherein the elastic member is connected between the base and the second main body; and the fixing portion abuts against the second main body.

17. The joystick of claim 13, wherein a second through hole is defined on the second main body, and the rod portion extends through the second through hole.

18. The joystick of claim 17, wherein a length of the second through hole is greater than a width of the second through hole, and the length is greater than the width.

19. A terminal device comprising:
    a joystick comprising:

a housing;

a handle extending through the housing;

a first limiting member fixed to the handle and movably clamped to the housing;

a second limiting member movably connected to the handle and movably clamped to the housing;

an elastic member connected to each of the first limiting member, the second limiting member, and the housing; the elastic member is in a compressed state, the second limiting member abutting against the handle;

a magnet; and a magnetic sensor;

wherein, the magnet is fixed to one of the handle and the housing, and the magnetic sensor is fixed to the other one of the handle and the housing.

20. The terminal device of claim 19, wherein the housing comprises a base and a cover, the base and the cover form an accommodating space; the first limiting member, the second limiting member, and the elastic member are accommodated in the accommodating space.

* * * * *